Patented Dec. 21, 1937

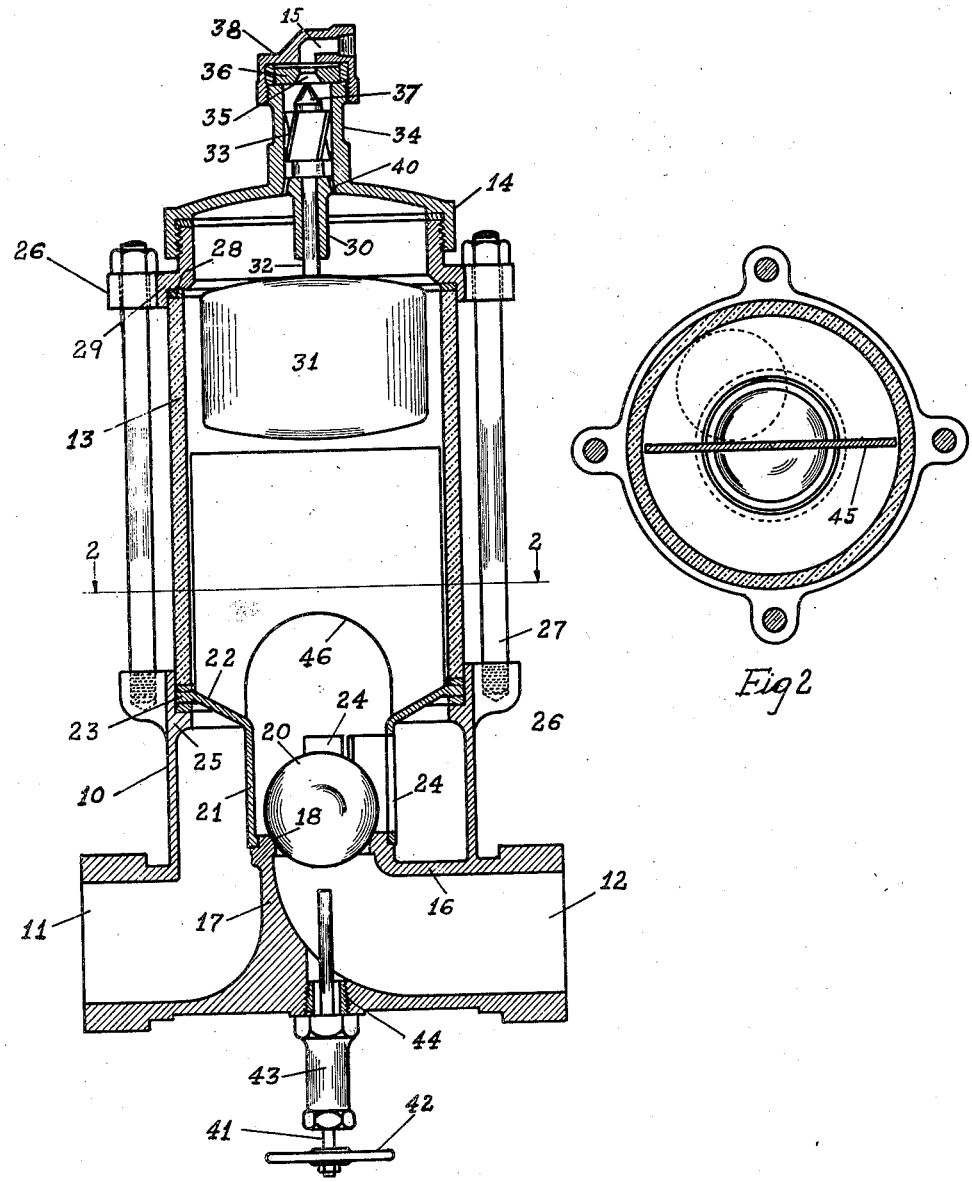

2,103,057

UNITED STATES PATENT OFFICE 2,103,057

GAS AND AIR TRAP

Jacob C. Blumer, Monroe, Wis., assignor to Freyn Engineering Company, Chicago, Ill., a corporation of Maine Application March 4, 1935, Serial No. 9,270

12 Claims. (Cl. 137—68)

The invention relates to the metering of liquids such as beer and has particular reference to a gas and air trap for installation in the liquid line leading to the meter to prevent gas and air from passing through said meter.

The meters now in use for measuring beer to determine the liquid quantity on which a tax is to be paid will measure gas and air the same as though it were liquid. For accurate determination, therefore, it is necessary to prevent gas and air from accumulating in the liquid line leading to the meter and also to shut off the flow from the tank or other receptacle the instant the same becomes empty, or else the gas and air remaining in the receptacle will enter the liquid line and flow through the meter.

The invention has for its principal object to provide a gas and air trap that will operate automatically to close the liquid outlet when an excessive accumulation of gas and air in the line is delivered to the trap and which will then exhaust said gas and air to the atmosphere. When liquid is again delivered to the trap the valve closing the outlet will rise to again permit the liquid to flow through said outlet, unless the pressure difference between inlet and outlet is great enough to hold the valve on its seat. Therefore, another object of the invention is to provide means for manually lifting the valve to start the flow of liquid through the outlet, whereupon the pressure between inlet and outlet is equalized and the valve will rise of its own accord.

Another object is to provide a gas and air trap of improved construction having means for directing the initial flow of liquid upwardly to thereby assist in raising the valve to open the liquid outlet.

Another object resides in the provision of a gas and air trap having improved operation, which will by-pass the gas or air when the flow of the same is small in comparison to the flow of liquid and which will embody means for breaking up the whirl-pool of liquid that occasionally forms within the trap, since the same interferes with the flow of the liquid by closing the outlet. The swirling action of the whirl-pool tends to draw the ball float valve to the center of the trap and to suck the same downwardly against its seat to thereby stop the flow of liquid through the outlet.

Another object is to provide a gas and air trap that can be readily disassembled so that the various operating parts can be removed, cleaned and the trap reassembled in a very few minutes.

With these and various other objects in view the invention may consist of certain novel features of construction and operation, as will be more fully described and particularly pointed out in the specification, drawing and claims appended thereto.

In the drawing which illustrates an embodiment of the invention and wherein like reference characters refer to like parts—

Figure 1 is a vertical sectional view taken substantially through the center of a gas and air trap constructed in accordance with the invention; and Figure 2 is a sectional view taken along line 2—2 of Figure 1.

The embodiment of the trap shown in the drawing consists essentially of three main parts, which, when assembled, house the several operating elements. One part consists of a casting or base portion 10 having an inlet 11 and an outlet 12. A cylindrical housing 13 of glass forms the middle or intermediate portion of the trap, while the third part comprises an upper cap member 14 provided with the gas or air exhaust port 15. The inlet 11 and outlet 12 may be provided with exterior threads or constructed in any other manner to facilitate a connection with the conduits forming the liquid line. The casting 10 is provided with an interior wall 16 integral therewith, defining the outlet, and an integral wall 17 which is common to both the inlet and outlet. These walls join to form the discharge opening of the trap which is bevelled at 18 to provide an annular seat for the ball float 20, which may be constructed of cork or may consist of a hollow metal ball that will float.

The exterior of the outlet is shouldered for supporting the cylinder 21 having a flaring upper end 22 terminating in the flange 23. The side of the cylinder opposite to the inlet 11 is provided with a plurality of longitudinal openings 24 which extend from adjacent the outlet to the beginning of the flare 22. The flanged portion 23 of the cylinder seats on an inwardly directed ledge 25 and in turn supports the glass cylinder 13 which fits within the upper end of the casting 10.

Said end of the casting is provided with a plurality of projecting lugs 26 which receive the threaded ends of the bolts 27 for retaining the cap portion 14 and cylinder 13 to the casting, said cap likewise having a plurality of projecting lugs 26 through which the upper end of the bolts pass. The cap portion is formed with an annular seat or shoulder 28 and a depending flange 29 having a close fit with the upper end of the glass cylinder and whereby the cap portion is supported and retained on said cylinder. A center stem 30 depends from the interior of the cap 14 and supports the cylindrical float 31 connected to rod 32 passing through the stem 30 and which also extends into the chamber 33 formed by the walls 34 integral with the cap 14. The upper end of the rod is bevelled and is adapted to have seating engagement to close off the opening 35 in the top plate 36 of the chamber, thus providing a relief valve for the trap. Said plate is held in position by the closure 38 which is preferably threaded to the cap 14, being provided with the exhaust opening 15 which communicates with the opening 35, the chamber 33 and with the interior of the trap through vent openings 40.

It will be clear from the above that the construction of the trap permits the parts to be readily disassembled for cleaning purposes. Removal of the bolts 27 will disconnect the cap portion and glass cylinder from the casting and permit removal of the metal cylinder 21. Also the cap portion can be detached from the glass cylinder to facilitate cleaning of the ball float 31 while removal of closure 38 will give access to the gas and air exhaust valve.

Assuming that the gas and air trap of the invention has been connected into a supply line for supplying liquid such as beer to a meter the operation of the device is as follows:

The liquid or beer enters the trap through inlet 11 and flows through the openings 24 as these provide the only inlets to the interior of the trap. The initial flow of liquid therefore takes place in an upward direction and in the immediate vicinity of the ball float 20, thereby causing said float to rise within the cylinder 21. However, upward movement of the ball float will open the outlet 12 and permit the liquid to flow through said outlet to the meter. As the flow of liquid continues it will eventually fill the glass cylinder 13 and contact the cylindrical float 31 which is of hollow construction so that the same floats on the liquid and is thus caused to rise as the level of the liquid rises in the glass cylinder. The float is connected to rod 32 which is provided with the bevelled end 37 forming the actuating member of the exhaust valve. When this is moved into seating engagement with opening 35 the valve is closed and liquid is prevented from escaping through the gas and air exhaust opening.

In the event some gas or air is carried over into the trap by the liquid flowing therethrough it will of necessity rise to the top of the trap so that the gas will collect in the cap portion and will gradually lower the liquid level as the quantity of gas within the trap increases. When the quantity of gas has reached a point where the liquid level allows the float 31 to drop, the exhaust valve will automatically open, permitting escape of the entrapped gas and air. Should the gas come over with the liquid in such quantities that the liquid level in the trap drops to the level of the cylinder 21 it will be understood that the ball float 20 will thus be caused to enter said cylinder and should the level drop further the ball float will eventually seat itself on the outlet to close the same and prevent further discharge of liquid to the meter. Thus, when an excessive quantity of gas is delivered to the trap the flow of liquid through the outlet is cut off. When the flow of liquid to the trap again takes place it will rise in the cylinder 21 and the glass cylinder 13, while in the meantime will be continuously discharged through exhaust opening 15. Eventually the liquid will reach a level in the trap to close said exhaust opening and it sometimes happens that the pressure in the trap is high enough to hold the ball float on its seat. By pressure in the trap is meant the difference in pressure between inlet and outlet and when this is small the float will rise by reason of its buoyancy. When the pressure difference is large the float does not rise and to start the flow of liquid through the outlet when these conditions exist it has been found necessary to provide a float lifter which consists of a valve stem 41 having an operating handle 42 secured thereto. The stem is mounted in a member 43 threaded at 44 to the bottom of the casing 10 so that the inner end of the stem 41 is located within the outlet immediately below and substantially on the vertical center line passing through the ball float 20. Upward movement is imparted to the valve stem 41 through actuation of handle 42 for lifting the ball float from its seat. Immediately the liquid will flow through the outlet, equalizing the pressure difference between inlet and outlet, with the result that the ball float will rise in the trap of its own accord.

When liquid flowed through the trap at a high velocity it was found that the swirling action resulting therefrom tended to form a whirl-pool within the glass cylinder 13 which would carry the ball float around with it, the float eventually being drawn to the center of the whirl-pool and finally being sucked downward into contact with the outlet. To break up this whirl-pool and to thus prevent accidental closing of the liquid outlet a transverse vane 45 is located within the glass cylinder below the float 31, the vane having a central opening 46 therein and having sloping base portions resting on the flaring end 22 of the metal cylinder. The opening 46 allows the ball float to rise and to pass to one side or the other of the vane, as shown in Figure 2. In place of the single transverse vane shown, it has been found that a plurality of smaller vanes projecting inwardly from the glass cylinder will operate with equal efficiency.

Additional features of the present trap reside in the contour of the passage-ways to present as little agitation to the liquid as possible and in the accessibility of the several operating parts for cleaning purposes. Inasmuch as the present device has been particularly designed to render accurate the metering of beer, which becomes very sticky upon drying, it was found necessary to provide for quick cleaning of the outlet valve, the parts forming the exhaust valve and the supporting rod 32 of the cylindrical float 31. The trap can be readily disassembled as has been described so that the cleaning of the operating parts and their replacement require only a few minutes.

What is claimed is:

1. A device for venting gas and air from a liquid supply line, comprising a housing having an inlet for liquid and an outlet for said liquid, a member interposed between the inlet and outlet and having openings for admitting the liquid, means adapted to close said outlet but being caused to open by the flow of liquid to the housing, said openings in said member directing the initial flow of liquid upwardly to assist said means in opening the outlet, an exhaust opening in the upper portion of the housing for exhausting gas and air to the atmosphere, and an exhaust valve mechanically disconnected from said closing means and responsive to the liquid level within said housing for controlling said exhaust opening.

2. A device for venting gas and air from a liquid supply line, comprising a housing having an inlet for liquid and an outlet for said liquid, a member interposed between the inlet and outlet and having openings for admitting the liquid, means adapted to close said outlet but being caused to open by the flow of liquid to the housing, said openings in said member directing the initial flow of liquid upwardly to assist said means in opening the outlet, an exhaust opening in the upper portion of the housing, a valve for closing the exhaust opening, said valve being mechanically disconnected from said closing means, and a float connecting with said valve and being located within the housing, whereby said valve is actuated in a direction to close when the liquid in the housing contacts with said float.

3. A gas and air trap comprising a housing having an inlet supplying liquid to the trap and having an outlet for said liquid, a member interposed between the inlet and outlet, said member having a plurality of openings for admitting the liquid, a ball float adapted to close the outlet, said openings directing the initial flow of liquid upwardly and against said ball float causing the same to rise and thereby open the outlet, an exhaust opening in the upper portion of the housing for venting the gas and air escaping from the liquid, and a float operated valve operative independently of said outlet closing means for closing said exhaust opening.

4. A gas and air trap comprising a housing having an inlet for supplying liquid to the trap and having an outlet for said liquid, a member interposed between the inlet and said outlet, said member having a plurality of openings therein for admitting the liquid, a ball float adapted to close the outlet, said openings directing the initial flow of liquid upwardly and against said ball float causing the same to rise thereby opening the outlet, a transverse member positioned within the housing above said first-mentioned member for preventing a swirling action of the liquid when flowing through said housing, an exhaust opening in the upper portion of the housing for venting the gas and air escaping from the liquid, and a float operated valve for closing said exhaust opening.

5. A gas and air trap comprising a housing having an inlet for supplying liquid to the trap and having an outlet for said liquid, a member interposed between the inlet and said outlet, said member having a plurality of openings therein for admitting the liquid, a ball float adapted to close the outlet, said openings directing the initial flow of liquid upwardly and against said ball float causing the same to rise thereby opening, the outlet, means extending transversely within the housing and positioned above the member for preventing a swirling action of the liquid when flowing through the housing, an exhaust opening in the upper portion of the housing for venting the gas and air escaping from the liquid, a valve for closing the exhaust opening, and a float located within the housing and connecting with the valve whereby said exhaust opening is closed when the liquid in the housing reaches a certain level.

6. A gas and air trap including a base having an inlet for supplying liquid to the trap and having an outlet for said liquid, an intermediate portion extending upwardly from the base, and a cap resting on said intermediate portion and being secured to said base, said intermediate portion and cap providing a chamber communicating with said outlet, a ball float adapted to close the outlet, a member positioned between the inlet and outlet and adapted to encircle the ball float when the same is in engagement with the outlet, said member having a plurality of openings through which liquid is admitted to said chamber, said openings directing the initial flow of liquid upwardly and against the ball float causing the same to rise and to thereby open the outlet.

7. A gas and air trap including a base having an inlet for supplying liquid to the trap and having an outlet for said liquid, an intermediate portion extending upwardly from the base, and a cap resting on said intermediate portion and being secured to said base, said intermediate portion and cap providing a chamber communicating with said outlet, a ball float adapted to close the outlet, a member positioned between the inlet and outlet, said member having a plurality of openings through which liquid is admitted to said chamber, and a flaring upper end forming part of said member and providing a conical bottom for said chamber, the periphery of said flaring end being located between the base and said intermediate portion.

8. A gas and air trap including a base having an inlet for supplying liquid to the trap and having an outlet for said liquid, a cylindrical intermediate portion extending upwardly from the base, and a cap resting on said intermediate portion and being secured to said base, said intermediate portion and cap providing a chamber communicating with said outlet, a cylindrical member positioned between the inlet and outlet and having openings therein for admitting liquid, said cylindrical member having a flaring upper end the periphery of which is positioned between the base and intermediate portion, a ball float for closing the outlet, and a plunger mounted in the base below and in alignment with said outlet, said plunger being adapted for manual actuation for lifting the ball float out of contact with said outlet.

9. A gas and air trap including a base having an inlet for supplying liquid to said trap and an outlet for discharging liquid from said trap, a cylindrical intermediate portion extending upwardly from said base, a cap mounted upon said intermediate portion and secured to said base, said intermediate portion and said cap providing a chamber communicating with said outlet, a member positioned between said inlet and said outlet and having openings therein for admitting liquid, said member having a conical upper end the periphery of which is positioned between said base and said intermediate portion, a ball float for closing said outlet, and a float-controlled valve operative independently of said ball float for controlling communication between the upper region of said trap and the outside atmosphere.

10. A gas and air trap including a base having an inlet for supplying liquid to said trap and an outlet for discharging liquid from said trap, a cylindrical intermediate portion extending upwardly from said base, a cap mounted upon said intermediate portion and secured to said base, said intermediate portion and said cap providing a chamber communicating with said outlet, a member positioned between said inlet and said outlet and having openings therein for admitting liquid, said member having a conical upper end the periphery of which is positioned between said base and said intermediate portion, a ball float for closing said outlet, a float-controlled valve operative independently of said ball float for controlling communication between the upper region of said trap and the outside atmosphere, and a manually operable plunger mounted in said base below and in alignment with said outlet for lifting said ball float out of contact with said outlet.

11. In a gas and air trap, in combination, means providing a valve seat having a vertically disposed axis, a ball float adapted to rest upon said seat, said trap having a liquid inlet, and a liquid outlet controlled by said ball float, said trap including a chamber for providing for the accumulation of liquid passing from said inlet to said outlet, and a float valve operative independently of said ball float for controlling communication between the upper region of said chamber and the outside atmosphere.

12. In a gas and air trap, in combination, means providing a valve seat having a vertically disposed axis, a ball float adapted to rest upon said seat, said trap having a liquid inlet, and a liquid outlet controlled by said ball float, said trap including a chamber for providing for the accumulation of liquid passing from said inlet to said outlet, a float valve operative independently of said ball float for controlling communication between the upper region of said chamber and the outside atmosphere, and radially disposed means within said chamber for preventing the formation of whirlpools within the liquid in said chamber.

JACOB C. BLUMER.